United States Patent [19]

Lewallen et al.

[11] Patent Number: 4,530,853

[45] Date of Patent: Jul. 23, 1985

[54] NON-CONDUCTING OXIDATION RETARDANT COATING COMPOSITION FOR CARBON AND GRAPHITE

[75] Inventors: Steve F. Lewallen, Elizabethton; Billy J. Lewis, Johnson City; James R. McIver, Elizabethton; Robert E. Hoss, Johnson City; Edward W. Pierce, Elizabethton, all of Tenn.

[73] Assignee: Great Lakes Carbon Corporation, New York, N.Y.

[21] Appl. No.: 617,932

[22] Filed: Jun. 6, 1984

[51] Int. Cl.³ .............................................. B05D 5/12
[52] U.S. Cl. ...................................... 427/113; 427/122; 427/123; 427/126.3; 427/126.4; 427/403; 427/418; 427/419.3; 427/419.7; 373/88; 428/408
[58] Field of Search .................. 204/290 R, 294; 428/408; 427/113, 122, 123, 126.3, 126.4, 403, 418, 419.3, 419.7; 373/88

[56] References Cited

U.S. PATENT DOCUMENTS

| | | | |
|---|---|---|---|
| 2,685,539 | 8/1954 | Woodburn | 427/372.2 |
| 2,685,540 | 8/1954 | Woodburn | 427/372.2 |
| 2,685,541 | 8/1954 | Woodburn | 427/372.2 |
| 2,685,542 | 8/1954 | Woodburn | 427/372.2 |
| 2,715,080 | 8/1955 | Cashell | 428/408 |
| 2,906,632 | 9/1959 | Nickerson | 501/99 |
| 3,029,167 | 4/1962 | Carlson | 428/408 |
| 3,174,872 | 3/1965 | Fisher | 252/506 |
| 3,510,347 | 5/1970 | Strater | 106/14.12 |
| 3,814,699 | 6/1974 | Baldieri et al. | 204/290 R |
| 3,881,039 | 4/1975 | Baldieri et al. | 427/294 |
| 4,418,097 | 11/1983 | Misra | 427/226 |
| 4,435,510 | 3/1984 | Greensmith | 501/99 |

FOREIGN PATENT DOCUMENTS 1201702 8/1970 United Kingdom .

Primary Examiner—Richard Bueker
Attorney, Agent, or Firm—R. Laddie Taylor

[57] ABSTRACT

A multiple coating composition is utilized to provide oxidation resistance for carbon or graphite articles during use in high temperature environments. A method for applying the composition is also provided.

27 Claims, No Drawings

NON-CONDUCTING OXIDATION RETARDANT COATING COMPOSITION FOR CARBON AND GRAPHITE

BACKGROUND OF THE INVENTION

One of the most critical applications of carbon and graphite is as an electrode for arc melting of steel. During the past 20 years the use of electric furnaces for melting steel has grown from a small volume specialty process to a high volume process with probably the lowest production costs of any of the recognized metallurgical processes. The process typically consumes from 10–12 pounds of electrode material for each ton of steel produced for about 8% of the total production cost.

During operation of electric arc steel furnaces, the electrodes are subject to mechanical, chemical and electrical stresses of such severity that, particularly for ultra high powered furnaces, only graphite of very high quality can be used. The electrodes are subject to the mechanical stresses from falling scrap being melted and from the degree of inductance caused by the high AC current, and are particularly subject to oxidation due to the temperature reached, which may range up to the sublimation temperature of about 3600° C.

Pure graphite is one of the more inert and least reactive materials known at high temperatures. However, oxidation is a highly significant cause of deterioration of column strength of graphite electrodes in arc furnaces, and results in loss of electrode material. Thus retardation of the oxidation reactions could be highly beneficial in lowering consumption both by direct oxidation and by lessening breakage caused by oxidation-induced loss of strength.

During operation of an electric arc furnace, normally three electrodes are used, each of which is connected to one phase of the power supply through a metal clamp, and as the electrode is consumed, additional sections are added at the top and the column lowered to the operating level in the furnace. Although it is generally found that oxidation retardants are ineffective above about 1200° C., any improvement, even at lower temperatures, is welcome and can significantly reduce electrode consumption.

DESCRIPTION OF THE PRIOR ART

U.S. Pat. Nos. 2,685,539 and 2,685,540, Woodburn et al., Aug. 3, 1954, describe an aluminum phosphate oxidation retardant for carbon and graphite bodies and a method for producing them.

U.S. Pat. No. 2,685,541, Woodburn et al., Aug. 3, 1954, describes calcium phosphate oxidation retardants.

U.S. Pat. No. 2,685,542, Woodburn et al., Aug. 3, 1954, describes alkali metal phosphate oxidation retardants.

U.S. Pat. No. 2,906,632, Nickerson, Sept. 29, 1959, discloses an oxidation retardant solution of ammonium phosphate, zinc chloride, and boric acid.

U.S. Pat. No. 3,029,167, Carlson, Apr. 10, 1962, discloses the use of salts of organophosphoric acids as carbon and graphite impregnants.

U.S. Pat. No. 3,174,872, Fisher, Mar. 23, 1965, discloses the addition of boric acid-metal oxide and phosphate to a carbon mix before baking to form an oxidation-resistant glass.

U.S. Pat. No. 3,342,627, Paxton et al., Sept. 19, 1967, discloses the use of zinc oxide, boric acid and phosphoric acid as an oxidation retardant.

U.S. Pat. No. 3,510,347, Strater, May 5, 1970, discloses calcium and aluminum phosphates in specific ratios as oxidation retardants.

U.S. Pat. No. 3,814,699, Baldieri. June 4, 1974, discloses the use of phosphoric acid, a salt, an oxide or hydroxide of a Group II metal, boric acid or sodium tetraborate decahydrate, and nitric acid, sodium nitrite, or sodium carbonate as an oxidation retardant.

U.S. Pat. No. 3,881,039, Baldieri, Apr. 29, 1975, a division of the above, discloses a solution of an oxide or hydroxide of a Group II metal, nitric acid and boric acid as an oxidation retardant.

U.S. Pat. No. 4,418,097, Misra, Nov. 29, 1983, provides a process for reducing oxidation of graphite electrodes by coating them with a siloxane fluid, optionally having SiC particles suspended therein.

U.S. Pat. No. 4,435,510, Greensmith et al., Mar. 6, 1984, relates to particulate matter for protecting graphite electrodes from oxidation containing a graphite-wetting fusible matrix material and a refractory filler.

U.K. Pat. No. 1,201,702, Societe Le Carbone Lorraine, Aug. 12, 1970, discloses an oxidation retardant process by first impregnating carbon with boric acid or ammonium phosphate, then with a metal, e.g. copper.

U.K. patent application No. 52744/71, Bryce, Nov. 12, 1971, provides a method of applying a protective coating to a carbon or graphite electrode for an electric arc furnace in which the electrode is coated while still hot from the furnace so that a bond is formed upon application of the coating. Several coating compositions are disclosed.

German patent application No. 1,671,167, Tatabanyai Aluminiumkoho, Nov. 27, 1967, discloses an impregnant comprising furfural alcohol, anthracene oil, phosphoric acid and titanium ethyl ester as an electrode impregnant.

Japanese patent application No. 53008-608, Ibigawa Electric K.K., Jan. 26, 1978, discloses aluminum phosphates as graphite oxidation retardants.

DETAILED DESCRIPTION OF THE INVENTION

Oxidation retardant solutions have been used by graphite manufacturers to treat electrode sockets for many years. There have also been many attempts to use these solutions as oxidation retardants on the total graphite electrode. However, these have been unsuccessful in the past due to a variety of shortcomings including ineffectiveness, corrosion of the clamps, and high contact resistance between the electrode and the clamps caused by the use of a glassy type of oxidation retardant. Corrosion is often caused by the use of a solution containing halogen ions such as hydrochloric acid or its salts.

We have discovered an electrically non-conducting coating composition for carbon and graphite bodies which greatly reduces consumption of the bodies by oxidation.

Our coating composition is inexpensive and, if desired, may be applied by the user of the carbon or graphite body. In the case of graphite electrodes, the coating is not applied at the end faces of the electrode, nor at the location of connection of the current-supply clamp.

Our electrically non-conducting oxidation-retardant multiple coating composition comprises: (a) a first coating of a sprayable aqueous slurry of a high temperature cement consisting principally of a mixture of about 55–65 wt. % $SiO_2$, about 25–35 wt. % $Al_2O_3$ and about 5–15 wt. % $Na_2SiO_3$; and (b) a second coating over the first coating of a sprayable aqueous slurry comprising: (1) a mixture consisting of about 85–100 wt. % SiC, 0–15 wt. % graphite and 0–15 wt. % $SiO_2$, (2) $B_2O_3$, (3) $Na_2SiO_3$ and (4) $NH_4H_2PO_4$. The first coating is preferably applied to a thickness of about 0.5 to 1.5 mm. and the second coating to a thickness of 0.5 to 1.0 mm.

Preferably, the second coating consists of approximately, in parts by weight: (1) 200 to 400 parts water, (2) 100 to 130 parts of a mixture consisting of about 85–100 wt. % SiC, 0–15 wt. % graphite and 0–15 wt. % $SiO_2$, (3) 30 to 100 parts $B_2O_3$, (4) 1 to 5 parts $Na_2SiO_3$ and (5) 1 to 3 parts $NH_4H_2PO_4$; and most preferably (1) 300 parts water, (2) 110 parts of a mixture consisting of about 90 wt. % SiC, 5 wt. % graphite and 5 wt. % $SiO_2$, (3) 80 parts $B_2O_3$, (4) 4 parts $Na_2SiO_3$ and (5) 2 parts $NH_4H_2PO_4$.

In a preferred embodiment of the invention, the first coating is applied in two stages, the initial stage being applied to a thickness of about 0.1 to 0.5 mm and the additional stage being applied to a thickness of about 0.5 to 1.0 mm.

Additionally, we have discovered that adding aluminum metal to the high temperature cement slurry, preferably in an amount such that it consists of about 20 wt. % of the total weight of the solid material in the aqueous slurry, increases the oxidation retardant properties of the coating composition.

The method for applying the multiple coating generally comprises: (a) applying the first coating; (b) drying the coating, including allowing the coating to dry at ambient temperature; (c) applying the second coating; and (d) repeating step (b). In the case of a two stage initial coating, the first stage is dried prior to application of the second stage.

Optionally, a waterproofing agent, such as paraffin, may be applied to the multiple coated body.

PREFERRED EMBODIMENT OF THE INVENTION

The following example will further describe the invention. It is understood that the example is provided to illustrate the practice of the invention, and is not intended as limiting beyond the limitations imposed by the appended claims.

Components

First coating—50 wt. % aqueous slurry of a mixture consisting of: (a) 80 wt. % high temperature cement consisting principally of about 59.5 wt. % $SiO_2$, 30 wt. % $Al_2O_3$ and 10.5 wt. % $Na_2SiO_3$; and (b) 20 wt. % aluminum metal.

Second coating—300 ml aqueous slurry of a mixture of:
110 grams of a mixture consisting of about 90 wt. % SiC, 5 wt. % graphite and 5 wt. % $SiO_2$;
80 grams $B_2O_3$;
4 grams $Na_2SiO_3$; and
2 grams $NH_4H_2PO_4$.

Coating Procedure:
(1) The high temperature cement/aluminum slurry was sprayed onto 4"$\phi \times$ 5" graphite stock to a thickness of about 0.2–0.5 mm. and the slurry allowed to dry.

(2) The coated stock was again sprayed with the cement/aluminum slurry to a thickness of about 0.75–1.0 mm. and the slurry was allowed to dry.

(3) The two-stage coated stock was sprayed with the second coating as defined above to a thickness of about 0.75–1.0 mm. and the slurry was allowed to dry.

Note: The ends of the stock were not coated.

Furnace Testing:

Each individual piece of such treated stock and a control consisting of an essentially identical piece of untreated stock were placed in an electrical resistance furnace, heated to 1250° C. in an air atmosphere, and held at this temperature for two hours. The results of the test, along with the results utilizing stocks coated with the high temperature cement slurry alone or the second coating slurry defined above alone are presented below. Each piece of coated stock with a control piece were individually tested.

| Coating Material | % Wt. Loss |
| --- | --- |
| Control | ~23 ± 2 |
| High temperature cement slurry | 8.0 |
| Second coating | 14.2 |
| Two coating technique | 2.0 |

It can readily be deduced from the data that the non-conducting oxidation retardant multiple coating composition of the invention provides excellent oxidation resistance for carbon and graphite stock.

While the invention has been described in detail and with reference to a specific embodiment thereof, it will be apparent to one skilled in the art that various changes and modifications can be made therein without departing from the scope and spirit thereof, and, therefore, the invention is not intended to be limited except as indicated in the appended claims.

We claim:

1. A method for applying an electrically non-conducting multiple protective coating composition to a carbon or graphite body comprising:
   (a) applying a first coating of a sprayable aqueous slurry of a high temperature cement consisting principally of a mixture of about 55–65 wt. % $SiO_2$, about 25–35 wt. % $Al_2O_3$ and about 5–15 wt. % $Na_2SiO_3$;
   (b) drying said first coating;
   (c) applying a second coating over said first coating of an aqueous slurry comprising:
   (1) a mixture consisting of about 85–100 wt. % SiC, 0–15 wt. % graphite and 0–15 wt. % $SiO_2$,
   (2) $B_2O_3$,
   (3) $Na_2SiO_3$ and
   (4) $NH_4H_2PO_4$; and
   (d) drying said second coating.

2. The method of claim 1 wherein said first coating is applied to a thickness of about 0.5 to 1.5 mm. and said second coating is applied to a thickness of about 0.5 to 1.0 mm.

3. The method of claim 1 wherein said second coating consists of approximately, in parts by weight:
   (1) 200 to 400 parts water, (2) 100 to 130 parts of a mixture consisting of about 85–100 wt. % SiC, 0–15 wt. % graphite and 0–15 wt. % $SiO_2$,
(3) 30 to 100 parts $B_2O_3$,
(4) 1 to 5 parts $Na_2SiO_3$ and
(5) 1 to 3 parts $NH_4H_2PO_4$.

4. The method of claim 1 wherein a waterproofing agent is applied to the coated body.

5. The method of claim 4 wherein the waterproofing agent is paraffin.

6. A method for applying an electrically non-conducting multiple protective coating composition to a carbon or graphite body comprising:
(a) applying a first coating of a aqueous slurry of a high temperature cement consisting of a mixture of 59.5 wt. % $SiO_2$, 30 wt. % $Al_2O_3$ and 10.5 wt. % $Na_2SiO_3$;
(b) drying said first coating;
(c) applying a second coating over said first coating of an aqueous slurry consisting of approximately, in parts by weight:
(1) 300 parts water,
(2) 110 parts of a mixture consisting of about 90 wt. % SiC, 5 wt. % graphite and 5 wt. % $SiO_2$,
(3) 80 parts $B_2O_3$,
(4) 4 parts $Na_2SiO_3$ and
(5) 2 parts $NH_4H_2PO_4$; and
(d) drying said second coating.

7. The method of claim 6 wherein a waterproofing agent is applied to the coated body.

8. The method of claim 7 wherein the waterproofing agent is paraffin.

9. The method of claims 1, 3, 4, 5, 6, 7 or 8 wherein said first coating composition is applied in two stages.

10. The method of claim 9 wherein said first coating is initially applied to a thickness of about 0.1 to 0.5 mm., dried, then applied in an additional stage to a thickness of about 0.5 to 1.0 mm.

11. A method for applying an electrically non-conducting multiple protective coating composition to a carbon or graphite body comprising:
(a) applying an initial-stage first coating of a aqueous slurry of a high temperature cement consisting of a mixture of 59.5 wt. % $SiO_2$, 30 wt. % $Al_2O_3$ and 10.5 wt. % $Na_2SiO_3$;
(b) drying said initial-stage first coating;
(c) applying an additional-stage first coating of the slurry of (a) over said initial-stage first coating;
(d) drying said additional-stage first coating;
(e) applying a second coating over the two-stage first coating of an aqueous slurry consisting of approximately, in parts by weight:
(1) 300 parts water,
(2) a mixture consisting of about 90 wt. % SiC, 5 wt. % graphite and 5 wt. % $SiO_2$,
(3) 80 parts $B_2O_3$,
(4) 4 parts $Na_2SiO_3$ and
(5) 2 parts $NH_4H_2PO_4$; and
(f) drying said second coating.

12. The method of claim 11 wherein a waterproofing agent is applied to the coated body.

13. The method of claim 12 wherein the waterproofing agent is paraffin.

14. A method for applying an electrically non-conducting multiple protective coating composition to a carbon or graphite body comprising:
(a) applying a first coating of a sprayable aqueous slurry of a mixture of aluminum metal and high temperature cement consisting principally of a mixture of about 55–65 wt. % $SiO_2$, about 25–35 wt. % $Al_2O_3$ and about 5–15 wt. % $Na_2SiO_3$;
(b) drying said first coating;
(c) applying a second coating over said first coating of an aqueous slurry comprising:
(1) a mixture consisting of about 85–100 wt. % SiC, 0–15 wt. % graphite and 0–15 wt. % $SiO_2$,
(2) $B_2O_3$,
(3) $Na_2SiO_3$ and
(4) $NH_4H_2PO_4$; and
(d) drying said second coating.

15. The method of claim 14 wherein said first coating is applied to a thickness of about 0.5 to 1.5 mm. and said second coating is applied to a thickness of about 0.5 to 1.0 mm.

16. The method of claim 14 wherein said second coating consists of approximately, in parts by weight:
(1) 200 to 400 parts water,
(2) 100 to 130 parts of a mixture consisting of about 85–100 wt. % SiC, 0–15 wt. % graphite and 0–15 wt. % $SiO_2$,
(3) 30 to 100 parts $B_2O_3$,
(4) 1 to 5 parts $Na_2SiO_3$ and
(5) 1 to 3 parts $NH_4H_2PO_4$.

17. The method of claim 14 wherein said first coating consists of about 20 wt. % aluminum metal and about 80 wt. % high temperature cement.

18. The method of claim 14 wherein a waterproofing agent is applied to the coated body.

19. The method of claim 18 wherein the waterproofing agent is paraffin.

20. A method for applying an electrically non-conducting multiple protective coating composition to a carbon or graphite body comprising:
(a) applying a first coating of a aqueous slurry of a mixture consisting of about 20 wt. % aluminum metal and about 80 wt. % of high temperature cement consisting of a mixture of 59.5 wt. % $SiO_2$, 30 wt. % $Al_2O_3$ and 10.5 wt. % $Na_2SiO_3$;
(b) drying said first coating;
(c) applying a second coating over said first coating of an aqueous slurry consisting of approximately, in parts by weight:
(1) 300 parts water,
(2) 110 parts of a mixture consisting of about 90 wt. % SiC, 5 wt. % graphite and 5 wt. % $SiO_2$,
(3) 80 parts $B_2O_3$,
(4) 4 parts $Na_2SiO_3$ and
(5) 2 parts $NH_4H_2PO_4$; and
(d) drying said second coating.

21. The method of claim 20 wherein a waterproofing agent is applied to the coated body.

22. The method of claim 21 wherein the waterproofing agent is paraffin.

23. The method of claims 14, 16, 17, 18, 19, 20, 21 or 22 wherein said first coating composition is applied in two stages.

24. The method of claim 23 wherein said first coating is initially applied to a thickness of about 0.1 to 0.5 mm., dried, then applied in an additional stage to a thickness of about 0.5 to 1.0 mm.

25. A method for applying an electrically non-conducting multiple protective coating composition to a carbon or graphite body comprising:
(a) applying an initial-stage first coating of a aqueous slurry of a mixture consisting of about 20 wt. % aluminum metal and about 80 wt. % of high temperature cement consisting of a mixture of 59.5 wt. % $SiO_2$, 30 wt. % $Al_2O_3$ and 10.5 wt. % $Na_2SiO_3$;
(b) drying said initial-stage first coating;
(c) applying an additional-stage first coating of the slurry of (a) over said initial-stage first coating;
(d) drying said additional-stage first coating;
(e) applying a second coating over the two-stage first coating of an aqueous slurry consisting of approximately, in parts by weight:
(1) 300 parts water,
(2) 110 parts of a mixture consisting of about 90 wt. % SiC, 5 wt. % graphite and 5 wt. % $SiO_2$,
(3) 80 parts $B_2O_3$,
(4) 4 parts $Na_2SiO_3$ and
(5) 2 parts $NH_4H_2PO_4$; and
(f) drying said second coating.

26. The method of claim 25 wherein a waterproofing agent is applied to the coated body.

27. The method of claim 26 wherein the waterproofing agent is paraffin.

* * * * *